March 1, 1966 M. J. SCHMITZ 3,238,312
DEVICE FOR USE IN AN AUTOMATIC SIGNALLING SYSTEM
Filed Nov. 13, 1962
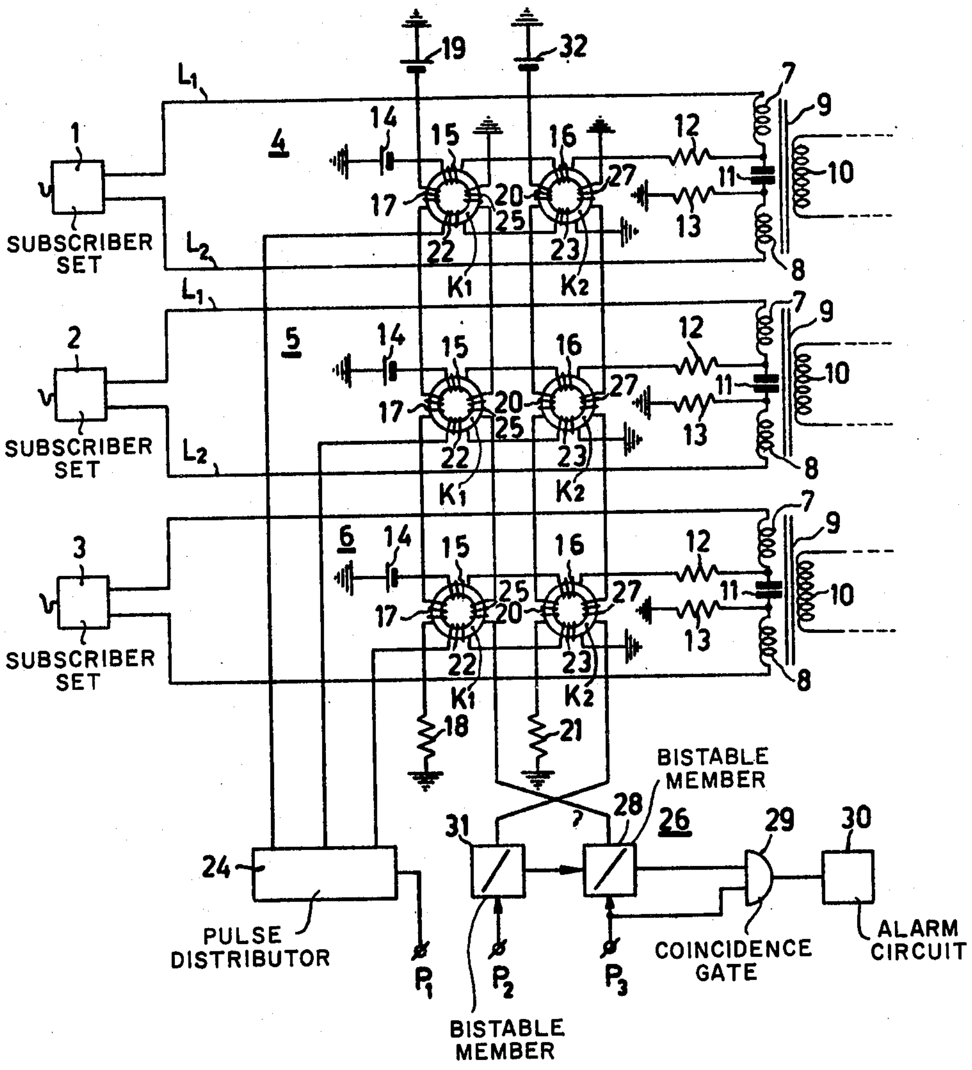
INVENTOR
MATTHEUS J. SCHMITZ
BY Frank R. Trifari
AGENT United States Patent Office 3,238,312
Patented Mar. 1, 1966

3,238,312

DEVICE FOR USE IN AN AUTOMATIC SIGNALLING SYSTEM

Mattheus Jacobus Schmitz, Hilversum, Netherlands, assignor to North American Philips Company, Inc., New York, N.Y., a corporation of Delaware Filed Nov. 13, 1962, Ser. No. 236,902
Claims priority, application Netherlands, Nov. 20, 1961, 271,594
5 Claims. (Cl. 179—175.25)

The invention relates to a device for use in an automatic signalling system, particularly a telephone system, in which incoming lines are supplied by a direct voltage.

In an automatic telephone system, deterioration of the insulation resistance of the lines which connect the subscriber's set with the exchange, may seriously disturb and even render impossible the speech transmission and the various signalling operations between the subscriber and the telephone exchange. A reduction in insulation resistance may be due to a defect in the telephone cable, since, for example, water may penetrate into the cable, so that the normally high insulation resistance between the two conductors of a subscriber line and between the conductors and ground may greatly decrease. After the cable has become defective, the insulation of a line decreases gradually, it is true, but the subscriber does not notice the effect until the signal transmission by way of the subscriber line is seriously disturbed.

An object of this invention is to provide means for determining the occurrence of a decrease of the resistance of a line as soon as possible. The invention is based on the recognition of the fact that static, magnetic threshold devices can be employed to provide a particularly simple device for providing an economic solution of the above-stated problem.

According to the invention, in order to determine the occurrence of a decrease in line resistance as soon as possible, two cores of magnetic material are added to the lines. These cores are provided with windings which are connected in series with one of the line conductors. The cores are normally presaturated magnetically, and are saturated in opposite senses at different values of a current passing through the line conductor.

A pulse generator is provided for applying periodically occurring pulses to windings provided on the cores. The magnetic effect of these pulses has the same sense as the initial presaturation. When a core is saturated in the opposite sense, these pulses are transmitted to an output winding arranged on the core. An alarm device is provided, which responds to a pulse transmitted to an output winding of a core, if the output winding of the other core does not receive a pulse.

The invention will now be described more fully with reference to one embodiment thereof as shown in the accompanying drawing.

The drawing shows the subscribers' sets 1 to 3, which are connected by way of the line conductors L1 and L2 to subscriber circuits 4 to 6. Only the part of these circuits directly related to the invention is shown. The line conductors L1 and L2 are connected to one end of the primary windings 7 and 8 of the transformer 9. The secondary winding 10 of transformer 9 is connected to a network of speech lines (not shown). A capacitor 11, together with resistors 12 and 13 and a supply battery 14 constitute the conventional supply circuit for the line conductors L1 and L2.

In order to determine as soon as possible the occurrence of a decrease in insulation resistance between the line conductors L1 and L2 and between the conductor $L_1$ and ground, each of the line circuits 4 to 6 is provided with two cores K1 and K2. These cores are provided with windings 15 and 16, which are connected in series with the line conductor L1. The cores K1 and K2 are normally presaturated magnetically. For this purpose each of the cores K1 of this embodiment is provided with a winding 17. Windings 17 are interconnected in series and connected in series with a resistor 18 between the terminals of a supply battery 19. This battery applies a premagnetizing current to the windings 17. The intensity of this current can be controlled by means of a resistor 18. In a similar manner the cores K2 are provided with windings 20, which are connected in series with the resistor 21 between the terminals of a supply battery 32.

When a subscriber lifts the receiver for making a call, a loop is closed in the subscriber's set by way of the conductors L1 and L2. The magnitude of the premagnetizing current through the winding 20 of the core K2 is chosen so that, when the line loop is closed, the current passing through the winding 16 saturates the core K2 in the opposite direction when the line loop has a maximum insulation resistance. When the insulation between the conductor L1 and the conductor L2 or between the conductor L1 and ground decreases, the current passing through the windings 15 and 16 of the cores K1 and K2 increases, when the loop is open. The premagnetizing current through the winding 17 of the core K1 is adjusted so that the core K1 is saturated in the opposite sense by the leakage current passing through the winding 15, if this current exceeds a given permissible maximum value. As a matter of course, this value is lower and even much lower than the current passing through the subscriber's set when the loop is closed. The two cores K1 and K2 have the function of a threshold device, the threshold value of the core K1 being the maximum permissible leakage current and the threshold value of the core K2 being the minimum value of the current passing through a closed line loop.

It should be noted that cores of magnetic material having a rectangular hysteresis loop in themselves have a threshold. This threshold is given by the kink of the hysteresis loop. When such cores are employed, the threshold can be adjusted to a given value by the choice of the material, the dimensions of the cores or of the number of turns of the windings 15 and 16. If one or a combination of these possibilities are chosen, a premagnetizing current may be dispensed with.

In order to examine whether the current passing through a conductor L1 lies between the threshold values of the cores K1 and K2, pulses are periodically fed to the windings 22 and 23, arranged on the cores. The magnetic effect of these pulses has the same sense as the initial premagnetization by windings 17 and 20. The windings 22 and 23 are connected in series and connected to an output of a pulse distributor 24, which feeds the pulses fed to its input in order of succession to different outputs. A pulse generator, not shown in the drawing, supplies three phase-shifted pulse sequences P1, P2 and P3, the generator supplying consecutively a pulse P1, a pulse P2, then a pulse P3 and again a pulse P1. The pulse sequence P1 is fed to the input of the pulse distributor 24, which distributes these pulses among its outputs.

The cores K1 are provided with output windings 25, which are connected in series with each other and are connected to a device 26. In the same manner the cores K2 are provided with windings 27, which are connected in series with each other and are also connected to the device 26. If the cores K1 and K2 are in the initial premagnetization state, a pulse $P_1$ across the windings 22 and 23 tends to further magnetize the cores in the same sense. If the core $K_1$ is saturated magnetically in the opposite sense by the leakage current passing through the conductor L1, the core K1 is temporarily demagnitized by the pulse P1 and the pulse P1 is transmitted to the output winding 25. If in the subscriber's set a loop is closed by way of the conductors L1 and L2, the two cores K1 and K2 are saturated in opposite senses. A pulse P1 demagnetizes temporarily the two cores, so that the pulse P1 is transmitted not only to the output winding 25 but also to the output winding 27.

The device 26 serves to *distinguish between* a loop closed via the conductors L1 and L2 and a decrease of the insulation resistance of the conductor L1. In the first case the two cores K1 and K2 furnish an output pulse and in the second case only the core K1 furnishes an output pulse. A pulse transmitted to the winding 25 moves the bistable member 28, for example a flip-flop into one of its stable states, for example the state 1. If no pulse is transmitted to the output winding 27 of the core K2, the bistable member remains in the state 1. The next-following pulse P3, supplied by the pulse generator, moves the bistable member 28 into the state 0. During the transition from the state 1 to the state 0, the bistable member 28 furnishes a pulse to an input of a coincidence gate 29, which receives a pulse P3 at a second input. This coincidence gate supplies a pulse, when the pulses coincide at its two inputs, and feeds it to an alarm circuit 30, which is thus rendered operative. However, if in the event of a closed line loop, a pulse is transmitted to the output winding 27 of the core K2, this pulse moves a bistable member 31 into the state 1. The next-following pulse P2 moves the bistable member 31 back into the state 0. During this transition the bistable member 31 furnishes a pulse and feeds it to the bistable member 28, which thus changes over from the state 1 to the state 0. The output pulse of the bistable member 28 is then inoperative, since it occurs at the instant of a pulse P2, when the coincidence gate 29 does not receive a pulse at its second input. It will therefore be obvious that the alarm circuit 30 is not actuated when the line loop is closed. This is, of course, also the case, when the leakage current is lower than the maximum permissible value.

In making a choice with the aid of a selection contact included in the line loop it is advantageous to utilize the threshold effect of cores of magnetic material having a rectangular hysteresis loop.

By opening the selection contact the current through the line loop drops and passes through the range lying between the threshold values of the cores. Owing to the rectangular nature of the hysteresis loop the cores remain saturated in opposite senses. A pulse P1, occurring at the instant when the current value lies in between the threshold values, moves the two cores back into the initial presaturation state, so that, as stated above, the alarm circuit 30 is not actuated.

What is claimed is:

1. In an automatic signalling system of the type having a communication line selectively energized with a direct current, testing means for indicating a decrease in insulation resistance of said line below a predetermined value, said testing means comprising first and second cores of magnetic material, each of said cores having first, second and output windings, means connecting said first windings in series with said line, whereby said direct current magnetically saturates said first and second cores in a first magnetic sense at first and second different predetermined magnitudes of current respectively, a source of periodic pulses connected to said second winding, said pulses having a polarity tending to saturate said cores in a second magnetic sense, whereby pulses are transmitted to said output windings upon the occurrence of said periodic pulses when the current in the respective first winding has a sufficient magnitude to saturate the respective core in said first magnetic sense, and means connected to said output windings and responsive to absence of coincidence of pulses from said output windings for indicating a decrease of said insulation resistance.

2. In an automatic signalling system of the type having a communication line selectively energized with a direct current, means for indicating a decrease in insulation resistance of said line, said means comprising first and second cores of magnetic material, each of said cores having first, second and output windings, means for presaturating said magnetic cores in a first magnetic sense, means for serially connecting said first windings with said line whereby said cores magnetically saturate in a second magnetic sense at different predetermined values of current in said line, a source of periodic pulses connected to said second windings and having a polarity tending to saturate said cores in said first magnetic sense, whereby output pulses are induced in said output windings in response to said periodic pulses only when the direct current in the respective first windings is sufficient to saturate the respective cores in said second sense, and output means connected to said output windings for indicating the absence of coincidence of pulses induced in said output windings.

3. The signalling system of claim 2, in which said means for presaturating said cores comprises third windings on each of said cores, and means for energiing said third windings with a direct current.

4. In an automatic telephone system of the type having a communication line connected to a subscriber station, and a source of direct current connected to said line whereby a direct current normally flows in said line only when said subscriber's station is busy, means for indicating the flow of current in said line due to a decrease in insulation resistance of said line, said means comprising first and second cores of magnetic material each having first, second and output windings, means for presaturating said cores in a first magnetic sense, means for serially connecting said first windings with said line whereby said first and second cores saturate in a second magnetic sense when said subscriber's set is busy and said line has a predetermined maximum insulation resistance, and said second core saturates in a second magnetic sense when said subscriber's set is not busy and said insulation resistance has decreased to a predetermined value below said maximum resistance, a source of periodic pulses connected to said second windings for simultaneously applying pulses thereto tending to saturate said cores in said first magnetic sense, and output circuit means connected to said output windings for indicating an absence of coincidence of pulses in said output windings.

5. In an automatic telephone system of the type having a plurality of communication lines connected to separate subscriber's stations, a source of direct current connected to said lines whereby direct current flows in said lines normally only when the respective subscriber's set is busy, means for indicating a decrease in insulation resistance of said lines comprising a plurality of magnetic cores each having first, second and output windings, means for magnetically presaturating said cores in a first sense, means for serially connecting the first winding of a separate pair of said cores in each communicating line, whereby one core of each pair saturates in a second magnetic sense when the insulation resistance of the respective line exceeds a first predetermined value and the respective subscriber's station is busy, and the other core of each pair saturates in a second magnetic sense when the respective subscriber's set is not busy and the insulation resistance of said repective line is below a second predetermined value, a source of periodic pulses, means for sequentially applying said pulses to the second windings of each pair of cores, said pulses having a polarity tending to saturate said cores in said first magnetic sense, and output circuit means connected to said output windings for indicating the absence of coincidence of pulses induced in the output windings of each pair of cores due to the application of said periodic pulses to the second windings of the respective pair of cores.

References Cited by the Examiner

UNITED STATES PATENTS 3,064,090 11/1962 Hersey ---------- 179—175.25

ROBERT H. ROSE, *Primary Examiner.*